US008223592B2

(12) United States Patent
Graber

(10) Patent No.: US 8,223,592 B2
(45) Date of Patent: Jul. 17, 2012

(54) OMNI-DIRECTIONAL ACOUSTIC RADIATOR WITH RADIAL WAVEGUIDES FOR SUBMERSIBLE MULTI-TRANSDUCER ARRAY

(76) Inventor: Curtis E. Graber, Woodburn, IN (US)

( * ) Notice: Subject to any disclaimer, the term of this patent is extended or adjusted under 35 U.S.C. 154(b) by 141 days.

(21) Appl. No.: 12/802,711

(22) Filed: Jun. 11, 2010

(65) Prior Publication Data

US 2011/0305117 A1 Dec. 15, 2011

(51) Int. Cl.
*G10K 11/00* (2006.01)
*H04B 11/00* (2006.01)
*H04R 25/00* (2006.01)

(52) U.S. Cl. ........ 367/153; 367/133; 367/140; 367/141; 381/182

(58) Field of Classification Search .................. 367/153, 367/133; 381/182
See application file for complete search history.

(56) References Cited

U.S. PATENT DOCUMENTS 3,569,921 A * 3/1971 Teel .............................. 367/157
4,929,955 A * 5/1990 Miles et al. .................... 342/371
5,103,129 A * 4/1992 Slayton et al. ................ 310/335
5,546,361 A * 8/1996 Boucher et al. ............... 367/158
7,837,006 B1 * 11/2010 Graber .......................... 181/191
2004/0156519 A1* 8/2004 Geddes ......................... 381/343
2005/0000688 A1* 1/2005 Hsu et al. ................... 166/254.2
2006/0285712 A1* 12/2006 Butler ........................... 381/340
2007/0196063 A1* 8/2007 Dragic .......................... 385/126
2008/0273851 A1* 11/2008 Dragic .......................... 385/127
2009/0065486 A1* 3/2009 Yamashita ............... 219/121.58
2009/0158850 A1* 6/2009 Alleyne et al. .................. 73/623
2009/0299360 A1* 12/2009 Ormsby .......................... 606/33
2010/0119090 A1* 5/2010 Graber .......................... 381/190
2010/0230387 A1* 9/2010 Okesaku et al. ................ 216/69

FOREIGN PATENT DOCUMENTS

WO WO 2007125308 A2 * 11/2007

OTHER PUBLICATIONS

Pengcheng Jia; Lee-Yin Chen; Alexanian, A.; York, R.A.; , "Multioctave spatial power combining in oversized coaxial waveguide," Microwave Theory and Techniques, IEEE Transactions on , vol. 50, No. 5, pp. 1355-1360, May 2002.*
K. Singh, P. K. Jain, and B. N. N. Basu, "Analysis of a coaxial waveguide corrugated with wedge-shaped radial vanes considering azimuthal harmonic effects," Progress in Electromagnetics Research, vol. 47, 297-312, 2004.*
Gottman, O., Kaatze, U., and Petong, P., "Coaxial to circular waveguide transition as high-precision easy-to-handle measuring cell for the broad-band dielectric spectrometry of liquids" Meas. Sci. Technol. 7 (1996), pp. 525-534.*

* cited by examiner

*Primary Examiner* — Jack W Keith
*Assistant Examiner* — James Hulka
(74) *Attorney, Agent, or Firm* — Paul W. O'Malley; Susan L. Firestone

(57) ABSTRACT

An acoustic radiator for underwater application is provided by opposing boundaries mutually spaced and centered on a common axis, a plurality of radial barriers located perpendicular to and connected between the top and bottom boundaries to define a plurality of adjacent radial waveguides, and a plurality of transducers disposed in each radial waveguide, and with one group of transducers being located radially outwardly from another group, the groups being defined in part by all members of the group being the same distance from the apex of the radial waveguide.

10 Claims, 5 Drawing Sheets

OMNI-DIRECTIONAL ACOUSTIC RADIATOR WITH RADIAL WAVEGUIDES FOR SUBMERSIBLE MULTI-TRANSDUCER ARRAY

BACKGROUND

1. Technical Field

The disclosure relates to transducer arrays for producing sound, and more particularly to a high power sound source for use in liquids.

2. Description of the Problem

Sound is a disturbance in the physical properties of an elastic material/medium that propagates through the material. The disturbed physical properties can be alternation in pressure, the displacement of particles or a change in the density of the elastic material/medium. Sound in the form of an acoustic pressure wave will have alternating zones of high and low pressure, which can be referred to as the compression and rarefaction waves. An acoustic pressure wave propagating through a liquid medium can produce phase changes and otherwise affect physical properties of the liquid medium due to changing pressure. Pressure drops in a liquid medium can result in the liquid medium temporarily assuming a gaseous state, gasses dissolved in the liquid leaving solution, or both. In other words bubbles can form and collapse. Such bubbles are termed acoustic cavitation bubbles. Usually acoustic cavitation bubbles rapidly collapse, which in turn can produce intense shock waves.

Whether acoustic cavitation bubbles are a problem in a given situation depends upon the system. For example, in systems where the pressure variation is highest at the surfaces of the transducers acoustic cavitation bubbles occur along these surfaces and their occurrence decreases rapidly with increasing distance from the surface of the transducer. In such systems the transducer surfaces are vulnerable to damage from acoustic cavitation.

The acoustic cavitation phenomenon can also limit the amount of power that can be transferred from the transducer element(s) to the propagating medium and distort the resulting signal. A cavitation resistant array was proposed in U.S. Pat. No. 6,050,361 in which interstices of the sonar array between transducers was designed to match the specific acoustic impedance of water.

The present applicant has a pending United States Patent Application for an Omni-Directional Radiator for Multi-Transducer Array (Ser. No. 12/590,182, filed 4 Nov. 2009, which is incorporated herein by reference) which teaches use of a full or partial toroidal waveguide in sonar applications which limits cavitation for a given power input level. The radiator includes two facing interior surfaces forming boundaries. Acoustic transducers are arranged in a constellation along one of the interior surfaces of a waveguide to face the opposed surface. The facing interior surfaces extend outwardly from a central base or core of the waveguide and terminate at a mouth. Pressure waves propagating outwardly in the waveguide may be reinforced along a portion or substantially the full depth waveguide, including being summed in a cumulative or cascade manner, with operation of outer transducers being delayed and phase compensated to achieve coherent reinforcement of the pressure wave as it propagates outwardly from the core. The waveguide may be divided into channels by the use of interior radial baffles to increase output amplitude.

SUMMARY

An acoustic radiator for underwater application is provided by opposing boundaries mutually spaced, perpendicular to and centered on a common axis and a plurality of radial barriers located perpendicular to and connected between the top and bottom boundaries to define a plurality of adjacent radial waveguides. A plurality of transducers is disposed in each radial waveguide. The transducers are organized into at least first and second groups or ranks. The groups are characterized in part by the distance of the members of the group from the common axis or apex of the radial waveguide, with at least one group having members located further from the common axis than the other group.

Additional effects, features and advantages will be apparent in the written description that follows.

BRIEF DESCRIPTION OF THE DRAWINGS

The contribution to the art believed novel is set forth in the appended claims. The preferred mode of use will best be understood by reference to the following detailed description of an illustrative embodiment when read in conjunction with the accompanying drawings, wherein:

DETAILED DESCRIPTION OF PREFERRED EMBODIMENTS

Figure 1:
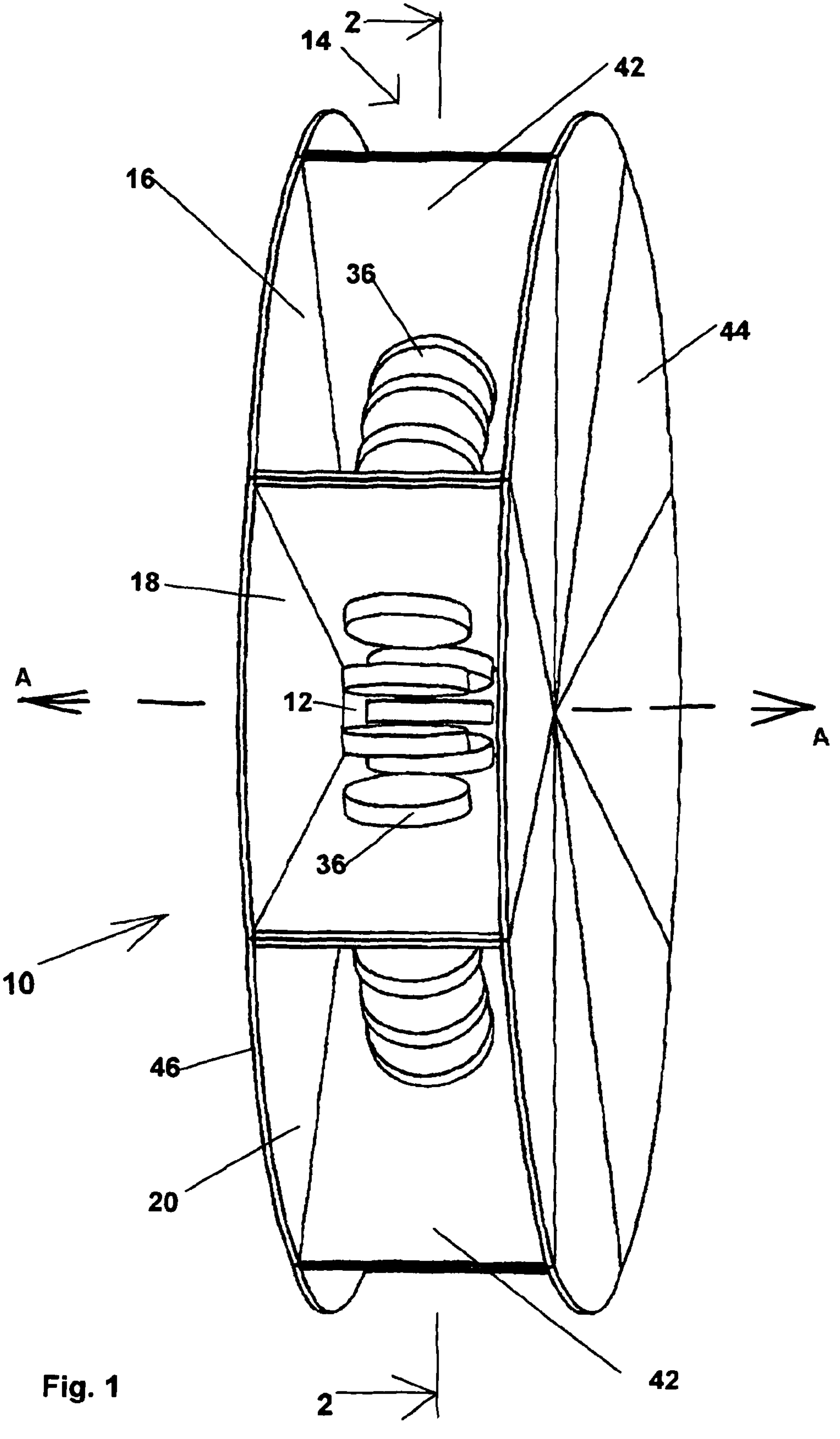
FIG. 1 is a perspective view of an omni-directional acoustic radiator in accord with one embodiment of the invention.
Figure 2:
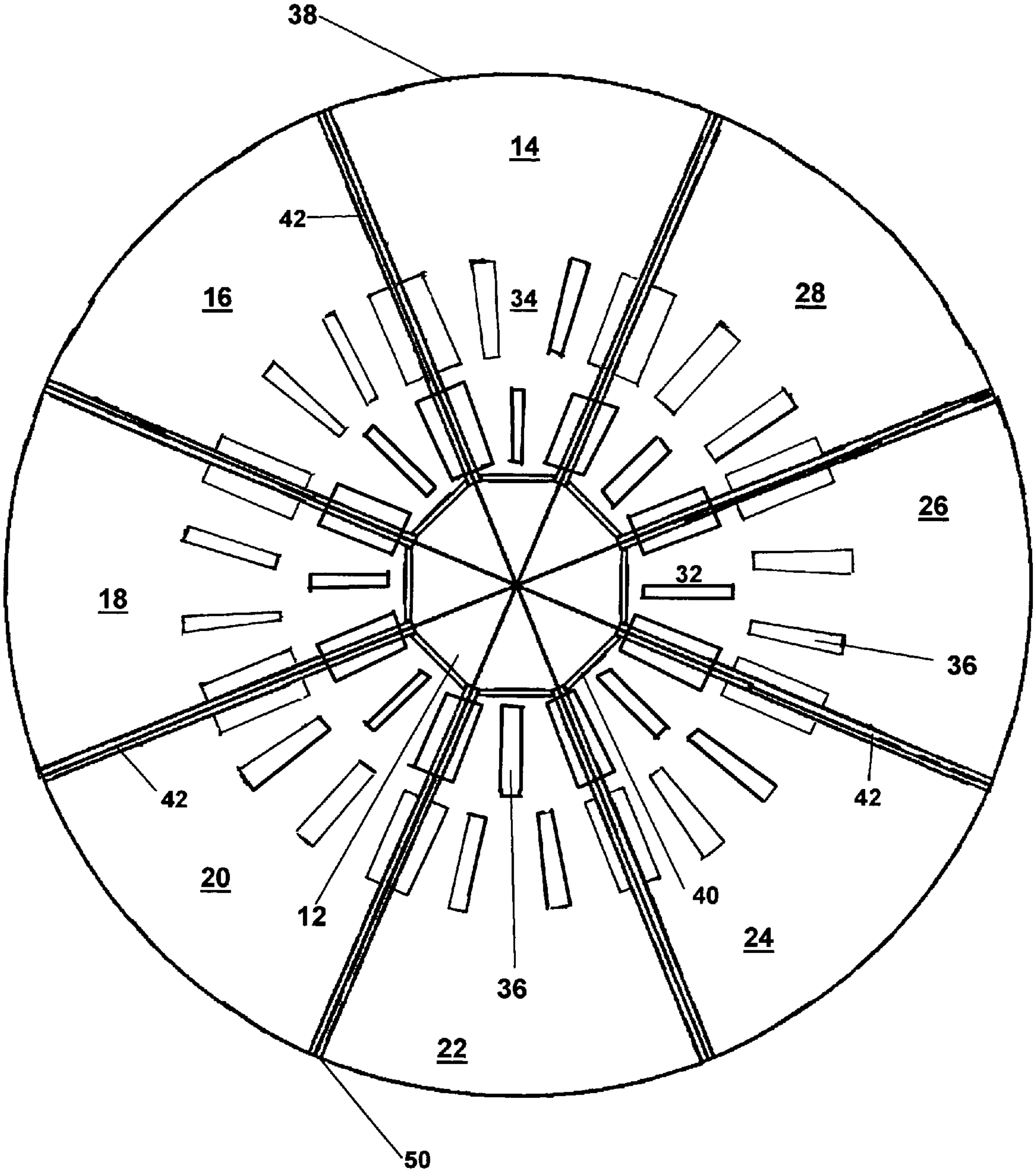
FIG. 2 is a cross-sectional view of the omni-directional radiator taken along section lines 2-2 in FIG. 1.

Referring now to the drawings and more particularly to FIGS. 1-2, an acoustic radiator 10 is shown. Acoustic radiator 10 may be employed to radiate sound in a liquid medium, typically fresh or sea water, and can operate through a full 360-degree arc or circle in a plane perpendicular to a vertical axis A, or in 45-degree arc segments corresponding to each of 8 radial waveguides 14, 16, 18, 20, 22, 24, 26 and 28. Radial waveguides 14-28 are arrayed in a plane and acoustic radiator 10 exhibits minimal vertical spread in an emission plane perpendicular to the A axis and parallel to the plane of the waveguides.

Radial waveguides 14-28 are defined by pairs of radial barriers 42 which converge on the central core 12 from the perimeter 50 of the acoustic radiator 10. The radial barriers 42 are located in planes including the vertical axis A, which is centered within central core 12. Radial waveguides 14-28 have rectangular cross sectional profiles with sides defined by the radial barriers 42 and opposed top and bottom boundaries provided by disks 44 and 46, which may be mounted perpendicular to and connected to the radial barriers 42 and centered on the central axis A.

Radial waveguides 14, 16, 18, 20, 22, 24, 26 and 28 resemble horns in some respects. Horns are conventionally employed as acoustic transformers in low impedance, highly compressible transmission mediums, such as air. In a highly compressible medium a horn increases the efficiency of coupling energy from a transducer/driver to the air by constraining expansion of the air in response to transducer movement in the vicinity of the transducer. In a liquid medium impedance matching functions are not significant at moderate power input levels, however the containment functionality provided still has application in a liquid transmission medium where acoustic cavitation is possible, enabling increased power input from piezoelectric transducers installed in the radial waveguides 14-28.

Piezoelectric transducers 36 are supported by suitable braces (not shown) in the waveguides or on the radial barriers 42. Increased power input is achieved using two ranks 32, 34, or arrays, of transducers 36. The second rank 34 is disposed radially outwardly (or at a greater displacement) from the apex 40 of each of the waveguides 14-28 than the first rank 32 of transducers 36. The first rank 32 of transducers 36 is located proximate to the apex 40 for each radial waveguide 14-28 at a central core 12. By initiating a sound wave using the first rank 32 and reinforcing the pressure wave by operating the second rank in phase with the phase of the sound wave as it passes the second rank toward the mouth 38 of a radial waveguide, the second rank 34 can be operated to maintain acoustic wave amplitude. Radial barriers 42 prevent omnidirectional propagation of the acoustic wave from any given rank of transducers 36, which could operate to cancel the signal.

By constraining displacement of liquid medium the phenomenon of the sound wave producing a change in phase of the medium is depressed because the transducer appears to operating at greater than its actual depth. This allows a step up in transducer operational intensity both initially and as it propagates from an apex 40 toward the mouth 38 of a given radial waveguide. The generation of acoustic cavitation bubbles during initial generation and reinforcement of the compression and rarefaction portions of an acoustic wave is retarded.

Figure 3:
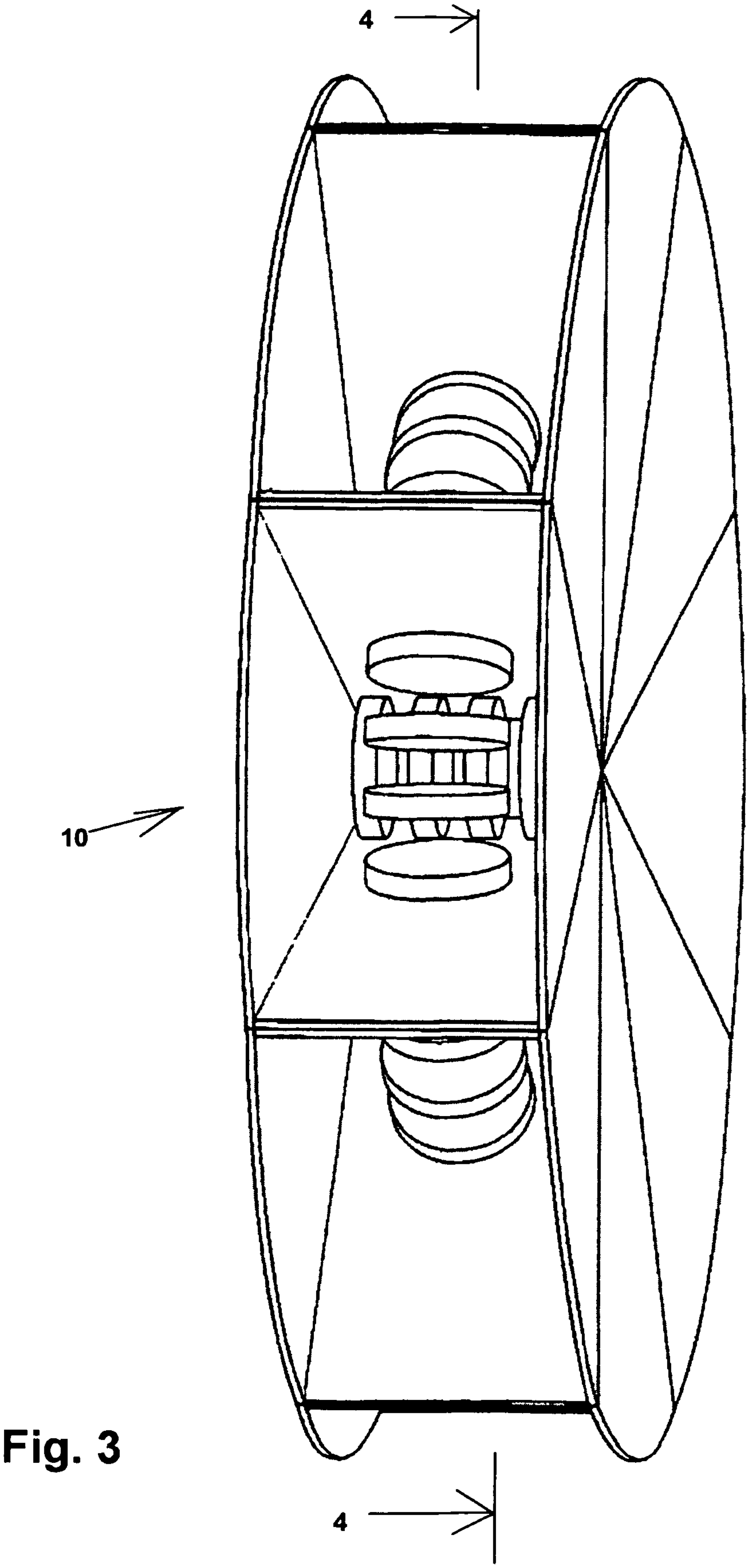
FIG. 3 is a perspective view of an omni-directional acoustic radiator in accord with one embodiment of the invention.
Figure 4:
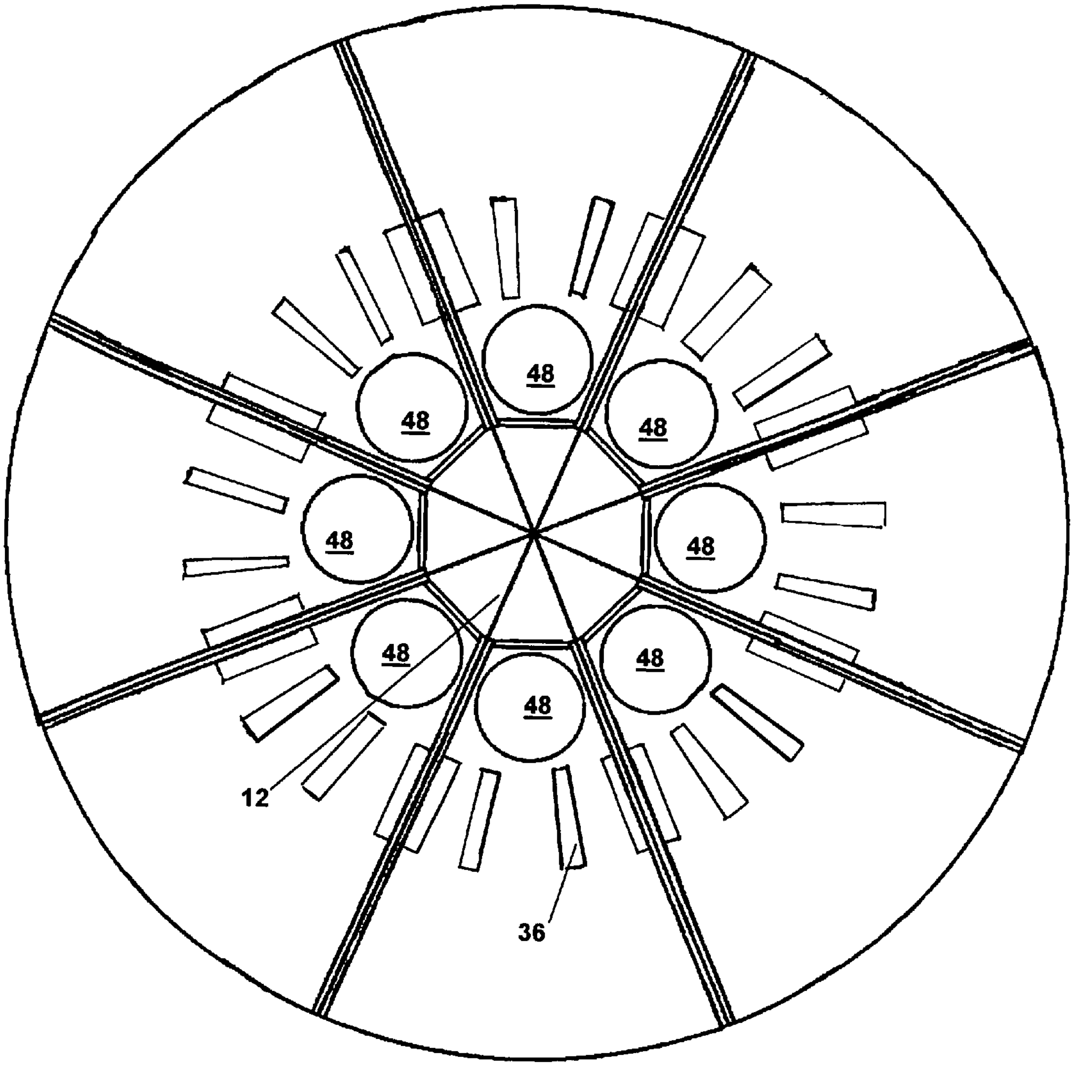
FIG. 4 is a cross-sectional view of the omni-directional radiator taken along section lines 4-4 in FIG. 1.

The first (inner) and second (outer) ranks 32, 34 of piezoelectric transducers 36 illustrate one way of stacking the transducers so that they are facing one another and spaced. For the first embodiment, the transducers 36 are disposed in what may be characterized as partial toroids located parallel to the plane of the acoustic radiator 10 with the center point of the full toroid located on the central axis A. The transducers 36 of the ranks are mutually spaced, facing one another and located in the toroids. A second embodiment illustrated in FIGS. 3-4 employs an inner rank 48 of piezoelectric transducers with the transducers mounted spaced from one another in a cylinder parallel to the central axis A. The outer rank 34 is unchanged from that used in the first embodiment and the second embodiment is otherwise physically identical to the first embodiment.

Piezoelectric acoustic transducers 17 are conventionally provided as circular disks, though such a shape is not necessarily best.

The outer rank 34 of transducers 36 should add enough energy, synchronized with the wave, to at least maintain the acoustic wave's amplitude notwithstanding the expanding circumference of a wave front in a radial waveguide.

Figure 5:
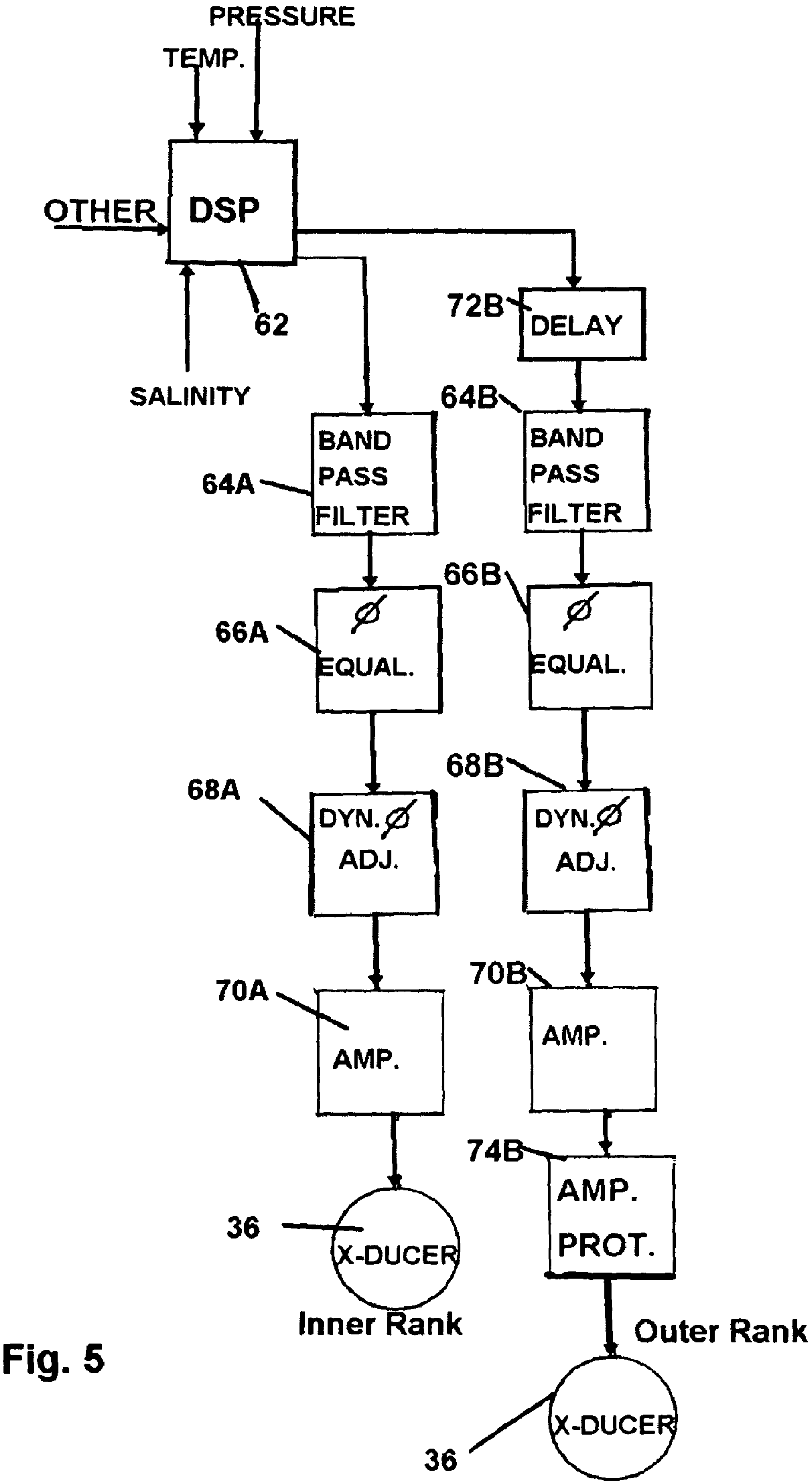
FIG. 5 is a block schematic of drive circuitry for the radiator.

Referring to FIG. 5, a block diagram circuit 60 illustrates a mechanism for control over transducer 46 inner and outer ranks 32 and 34 or 48 and 34. Block diagram circuit 60 is adapted for use of the system in a water environment, though its use in other liquid environments should not be discounted. A variety of factors must be taken into account in generating a high intensity underwater sound pulse, such as water depth (represented by pressure), salinity of the water and temperature of the water. All of the these factors affect water density and the speed of sound in water. In addition, other factors may be relevant to consideration of the possible onset of acoustic cavitation, such as the concentration of dissolved gasses, such as oxygen and nitrogen, in the water. Such measurements as are available (typically pressure, temperature and salinity) are provided a digital signal processor 62 which adjusts the base wave form for two channels (inner rank, outer rank) and generates a delay factor for transmission to the outer rank channel. The circuit channels correspond to the two ranks. Final amplifier stages 70A-B provide differential levels of amplification depending upon the number of transducers in a rank.

The inner and outer rank channels are schematically substantially identical save that the channel for the inner rank does not provide for delay of the base signal and may not require feedback protection for the final amplifier stage. Each channel includes a bandpass filter 64, an equalizer 66, dynamic phase adjustment 68 and final stage amplification 70. The outer channel adds delay elements 72 and amplification stage feedback protection 74.

The acoustic radiator 10 may also be operated as a highly directional receiver.

What is claimed is:

1. An acoustic radiator comprising:

opposing top and bottom boundaries mutually spaced and centered on a central core which defines a common axis;

a plurality of radial barriers extending from the central core located perpendicular to and connected between the top and bottom boundaries to define a plurality of adjacent radial waveguides having mouths distal to the common axis; and pluralities of liquid submersible transducers disposed in each radial waveguide, the plurality of liquid submersible transducers in each radial waveguide being arrayed in a pair of radially inner and outer ranks with each rank including at least two liquid submersible transducers.

2. The acoustic radiator of claim 1, further comprising:

the radial waveguides being located in a plane and defining a circular emission front.

3. The acoustic radiator of claim 2, further comprising:

a central core located at an apex for each radial waveguide.

4. The acoustic radiator of claim 3, the liquid submersible transducers being piezoelectric devices.

5. An acoustic radiator as claimed in claim 4, further comprising drive circuitry for the liquid submersible transducers for synchronously reinforcing a sound wave propagating along the length of each radial waveguide from the apex to a mouth.

6. The acoustic radiator of claim 5, further comprising:

the at least two liquid submersible transducers in the inner rank of each radial waveguide being disposed spaced from one another in a stack parallel to the central axis; and the at least two liquid submersible transducers in the outer rank of each radial waveguide being disposed in a facing relationship spaced from another in a partial toroid centered on the central axis.

7. The acoustic radiator of claim 5, further comprising:

the at least two liquid submersible transducers in the inner rank of each radial waveguide being disposed in a facing relationship spaced from one another in a partial toroid centered on the central axis; and the at least two liquid submersible transducers in the outer rank of each radial waveguide being disposed in a facing relationship spaced from another in a partial toroid centered on the central axis.

8. An acoustic radiator for underwater application comprising:

an arcuate emission front;

a plurality of waveguides extending from apexes with mouths to form the arcuate emission front;

a plurality of acoustic transducers positioned in each of inner and outer ranks in each waveguide, the inner rank being located substantially at the apex of the waveguide and the outer rank being located radially outwardly from the first rank; and drive circuitry for the acoustic transducers for synchronously reinforcing a sound wave propagating outwardly in each waveguide.

9. An acoustic radiator as claimed in claim 8, the arcuate emission front forming a circle defining an emission plane.

10. An acoustic radiator as claimed in claim 9, further comprising:

the acoustic transducers of the inner and outer ranks of transducers, being located in spaced, facing relationship with the other acoustic transducers of the same rank.

* * * * *